(12) United States Patent  
Han

(10) Patent No.: US 9,152,252 B2  
(45) Date of Patent: Oct. 6, 2015

(54) DISPLAY DEVICE AND DRIVING METHOD THEREOF

(71) Applicant: Samsung Display Co., Ltd., Yongin, Gyeonggi-Do (KR)

(72) Inventor: Sang-Myeon Han, Yongin (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 206 days.

(21) Appl. No.: 13/736,282

(22) Filed: Jan. 8, 2013

(65) Prior Publication Data

US 2014/0071112 A1    Mar. 13, 2014

(30) Foreign Application Priority Data

Sep. 11, 2012   (KR) .......................... 10-2012-0100566

(51) Int. Cl.
  *G06F 3/038* (2013.01)
  *G09G 3/32* (2006.01)
  *H04N 13/04* (2006.01)

(52) U.S. Cl.
  CPC ................ *G06F 3/038* (2013.01); *G09G 3/325* (2013.01); *H04N 13/0438* (2013.01)

(58) Field of Classification Search
  CPC ..................... G09G 3/30–3/3291; G06F 3/038; H04N 13/0438; H01L 27/32–27/3297
  See application file for complete search history.

(56) References Cited

U.S. PATENT DOCUMENTS

| | | | | |
|---|---|---|---|---|
| 2004/0256617 A1* | 12/2004 | Yamada et al. | ................. | 257/59 |
| 2006/0208977 A1* | 9/2006 | Kimura | ........................... | 345/76 |
| 2008/0169765 A1* | 7/2008 | Yamazaki et al. | ......... | 315/169.3 |
| 2011/0279437 A1* | 11/2011 | Komiya et al. | ............... | 345/212 |
| 2012/0062545 A1* | 3/2012 | Kim | .............................. | 345/212 |
| 2012/0112652 A1* | 5/2012 | Wang et al. | .................... | 315/224 |
| 2012/0139901 A1* | 6/2012 | Hwang | ........................ | 345/419 |
| 2012/0146979 A1* | 6/2012 | Kim et al. | ..................... | 345/211 |
| 2012/0146999 A1* | 6/2012 | Hwang | ........................ | 345/419 |
| 2013/0120337 A1* | 5/2013 | Guo et al. | ..................... | 345/211 |

FOREIGN PATENT DOCUMENTS

| | | | |
|---|---|---|---|
| JP | 20120043301 | * | 5/2012 |
| KR | 10-2005-0109163 A | | 11/2005 |
| KR | 10-2011-0013693 A | | 2/2011 |
| KR | 10-1073281 B1 | | 10/2011 |
| KR | 10-2012-0043301 A | | 5/2012 |

* cited by examiner

*Primary Examiner* — Sanjiv D Patel

(74) *Attorney, Agent, or Firm* — Knobbe Martens Olson & Bear LLP

(57) ABSTRACT

A display device comprising a display panel including a plurality of pixels configured to write a first image data signal corresponding to a corresponding frame for a first frame and emits light according to driving current depending on a second image data signal corresponding to a previous frame is disclosed. In one aspect, the first frame includes a reset period of resetting data voltage according to the second image data signal, a compensating period of compensating threshold voltages of driving transistors of the pixels, a data writing period of transferring scan signals corresponding to the pixels in sequence, writing the first image data signal, and a light emitting period of simultaneously emitting light according to the second image data signal, wherein the data writing period and the light emitting period frame are overlap each other.

22 Claims, 6 Drawing Sheets

DISPLAY DEVICE AND DRIVING METHOD THEREOF

CROSS-REFERENCE TO RELATED APPLICATION

This application claims priority to and the benefit of Korean Patent Application No. 10-2012-0100566 filed in the Korean Intellectual Property Office on Sep. 11, 2012, the entire contents of which are incorporated herein by reference.

BACKGROUND

1. Field

The present disclosure relates to a display device and a driving method thereof.

2. Description of the Related Technology

Recently, display panels have been commercialized with increased size and reduced weight, and a stable driving method to display an accurate and clear image with high-integration and high-precision for displaying a 3D stereoscopic image.

Particularly, a display device including a large-sized display panel or a high-speed frame driving for driving of the 3D stereoscopic image is required, but since respective periods for initialization of data voltage, compensation of threshold voltage of a driving transistor, writing of data, and light emission are not sufficiently ensured by the high-speed driving mode, it is difficult to display images having accurate luminance.

Further, in order to solve the problem, research and development for a pixel circuit structure, a driving mode, and luminance compensation have been conducted, but since the pixel circuit structure is complicated and power consumption increases according to the luminance compensation or the driving mode, adverse effects on production costs and uniformity of luminance may occur.

Generally, in display devices have a pixel circuit with five to eight transistors and two to three capacitors. In addition, a power supply wire for applying reference voltage or initial voltage of the capacitor may need to be additionally ensured in order to store the data voltage for one frame. In these display devices, the production yield of the display devices is decreased and ensuring an aperture ratio is difficult due to the complicated structure of the pixel circuit and the additional power supply wire of the display device. Further, in previous display devices, where the voltage is not stably and smoothly supplied through the power supply wire, screen uniformity of the display image of the display panel deteriorates.

Accordingly, a display device and a driving method thereof, which improves aspects such as simplification of pixel circuits and wirings, a simple displacement of layouts, ensuring for a sufficient period of each driving process, and ensuring for a manufacturing yield and an aperture ratio of the display panel, are required.

SUMMARY OF CERTAIN INVENTIVE ASPECTS

The present disclosure describes a display panel including a simplified pixel circuit while and a driving method thereof.

Further, the present disclosure describes a display device having advantages of providing relatively simple displacement of layouts without adding a separate voltage wire circuit in the display device, ensuring an aperture ratio, and ensuring a manufacturing yield of the display panel.

In addition, in some embodiments, the display device has the advantages of implementing accurate luminance and high-quality images by ensuring a sufficient threshold voltage compensating period of the transistor and sufficiently ensuring a data writing period and a light emitting period during the driving process of the display device.

In one aspect, a display device, comprises a display panel including a plurality of pixels configured to write a first image data signal corresponding to a first frame and configured to emit light according to a driving current based on a second image data signal corresponding to a second frame which is previous to the first frame; wherein the first frame includes a reset period wherein data voltages are reset to voltages of the second image data signal, a compensating period wherein threshold voltages of a driving transistors of each of the plurality of pixels are compensated substantially at the same time, a data writing period wherein scan signals corresponding to the plurality of pixels corresponding to the first image data signal are written, and a light emitting period wherein light is emitted by the plurality of pixels according to the second image data signal; and wherein the data writing period and the light emitting period overlap each other.

In some embodiments, the first image data signal is a first viewpoint image data signal or a second viewpoint image data signal, the second image data signal is a first view point image data signal or a second view point image data signal corresponding to the previous frame, and wherein the viewpoint data signals of the first image data signal and the second image data signal are different from each other.

In some embodiments, the first image data signal is a first view point image data signal or a second view point image data signal, and the plurality of pixels simultaneously emits light based on a driving current which corresponds to the first image data signal.

In some embodiments, the first image data signal is written simultaneously with the light emitting period of the second frame which is previous to the first frame.

In some embodiments, the data writing period is equal to or smaller than the light emitting period.

In some embodiments, the duration of the light emitting period is determined in the reset period.

In some embodiments, none of the plurality of pixels emits light for the reset period and the compensating period.

In some embodiments, the first frame further includes a bias period of applying voltages of a gate electrode, a source electrode, and a drain electrode of the driving transistor of one of the plurality of pixels as predetermined voltages after the light emitting period ends.

In some embodiments, each of the plurality of pixels includes: the organic light emitting diode; the driving transistor configured to transfer the driving current to the organic light emitting diode; a switching transistor configured to transfer data voltage of the first image data signal to the gate electrode of the driving transistor thereby activating the pixel in response to the scan signal; a compensation transistor connected between the gate electrode and the drain electrode of the driving transistor to diode-connect the gate electrode and the drain electrode of the driving transistor during the compensating period; a sustain transistor configured to adjust a contact point voltage of the driving transistor and the switching transistor according to a first power supply voltage; a storage capacitor configured to store data voltage of the first image data signal for the data writing period; and a sustain capacitor configured to sustain gate electrode voltage of the driving transistor at a predetermined voltage value for the compensating period.

In some embodiments, the storage capacitor is configured to store the data voltage of the first image data signal until a light emitting period of a subsequent frame.

In some embodiments, the first power supply voltage and a second power supply voltage are connected to a cathode of the organic light emitting diode and is configured to be transferred at a low level for a reset period; a first control signal configured to be transferred to the gate electrode of the compensation transistor at a gate-on voltage level for the reset period; and a second control signal configured to be transferred to the gate electrode of the sustain transistor at a gate-on voltage level for the reset period.

In some embodiments, the first power supply voltage and the second power supply voltage connected to a cathode of the organic light emitting diode are configured to be transferred at a predetermined high level for a compensating period; the first control signal configured to be transferred at a gate-on voltage level for the compensating period, and a scan signal configured to be transferred to the gate electrode of the switching transistor at a gate-on voltage level for the compensating period; a second control signal configured to be transferred to the gate electrode of the sustain transistor at a gate-off voltage level for the compensating period, and a predetermined reference voltage configured to be applied to one electrode of the storage capacitor through the turned-on switching transistor for the compensating period.

In some embodiments, a plurality of scan signals having gate-on voltage levels are configured to be sequentially transferred to the gate electrode of the switching transistor of each of the plurality of pixels for the data writing period; the first control signal is configured to be transferred to the gate electrode of the compensation transistor at a gate-off voltage level for the data writing period, the second control signal is configured to be transferred to the gate electrode of the sustain transistor at a gate-on voltage level for the data writing period; and the first power supply voltage is configured to be transferred at a predetermined high level for the data writing period and a second power supply voltage is connected to a cathode of the organic light emitting diode and is configured to be transferred to a predetermined low level.

In some embodiments, the display device further comprises a scan driver configured to generate and transfer a plurality of scan signals to activate driving of the plurality of pixels, a data driver configured to transfer data voltage according to the first image data signal corresponding to the plurality of pixels, a power controller configured to control driving power supply voltage supplied to the plurality of pixels; a compensation control signal unit configured to generate and transfer a first control signal and a second control signal for controlling open and close of the driving transistor in each of the plurality of pixels; and a timing controller configured to generate the first image data signal by processing an external image signal to transfer the generated first image data signal to the data driver and controlling driving of the scan driver, the data driver, the power supply controller, and the compensation control signal unit.

Another aspect relates to a display device comprising a display panel including a plurality of pixels which write a first image data signal corresponding to a first frame and emit light in organic light emitting diodes according to a driving current depending on a second image data signal corresponding to a frame previous to the first frame the method comprising resetting data voltage according to the second image data signal to a predetermined voltage; compensating threshold voltages of driving transistors of the plurality of pixels at the same time; transferring scan signals corresponding to the plurality of pixels in sequence to activate the plurality of pixels; writing the first image data signal; and emitting light according to the second image data signal, wherein writing the first image data signal and emitting light overlap with each other.

In some embodiments, the first image data signal is a first viewpoint image data signal or a second view point image data signal, the second image data signal is a first viewpoint image data signal or a second view point image data signal corresponding to a frame previous to the first frame, and the viewpoint image data signals of the first image data signal and the second image data signal are different from each other.

In some embodiments, the first image data signal is a first view point image data signal or a second view point image data signal, and the plurality of pixels emits light according to a driving current corresponding to the first image data signal for a light emitting period.

In some embodiments, writing the first image data signal is performed simultaneously with the emitting light according to the second image data signal.

In some embodiments, the period of writing the first image data signal is equal to or smaller than the period of emitting light according to the second image data signal.

In some embodiments, the emitting light according to the second image data signal is performed within a period when the resetting and the compensating of the one frame are not performed.

In some embodiments, while resetting and the compensating of the one frame are performed, none of the plurality of pixels emits light.

In some embodiments, the method further comprises setting voltages of gate electrodes, source electrodes, and drain electrodes of the driving transistor of each of the plurality of pixels as predetermined voltages, after the emitting light according to the second image data signal.

According to the exemplary embodiments of the present invention, since respective driving processes such as initializing of data voltage of the display device, compensating of threshold voltage of the transistor, writing of data, and emitting of light may be sufficiently secured, it is possible to provide uniformity of images and accurate luminance expression in the display panel.

Further, it is possible to provide a display device having advantages of providing a relatively simple layout without adding a separate voltage wire circuit in the display device and ultimately, ensuring an aperture ratio and ensuring a manufacturing yield of the display panel.

Therefore, it is possible to provide a driving method of a display device which may have large-sized high resolution and high-speed driving.

DETAILED DESCRIPTION

Figure 1:
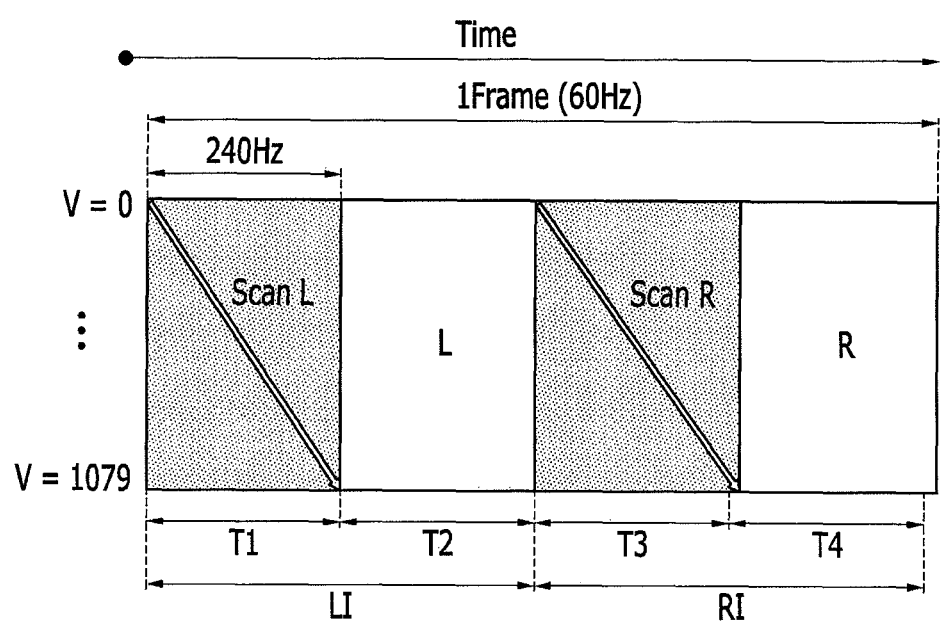
FIG. 1 is a diagram illustrating a driving method of a display device.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements.

FIG. 1 is a diagram illustrating a driving method of a display device in the related art.

A driving method of a display device illustrated in FIG. 1 illustrates an example of a driving method of the display device known in the art. Particularly, FIG. 1 illustrates that the display device is driven by dividing one frame 60 Hz into a first view point image period LI and a second view point image period RI, as a driving method of implementing a 3D stereoscopic image.

The first view point may be a left (right) eye view point, and the second view point may be a right (left) eye view point.

The same object is displayed for one frame by transferring an image data signal divided into the first view point and the second view point to be displayed so that a user feels a 3D stereoscopic effect.

Then, the first view point image period LI and the second view point image period RI include scan periods scanL and scanR and light emitting periods L and R so as to display images for the respective view points by driving all pixels of the display panel, respectively.

That is, the first view point image period LI includes a first view point scan period T1 sequentially activating the respective pixels so as to write a first view point image data signal in all the pixels of the display panel and a first view point light emitting period T2 displaying images according to the first view point image data signal. Further, the second view point image period RI includes a second view point scan period T3 sequentially activating the respective pixels so as to write a second view point image data signal in all the pixels of the display panel and a second view point light emitting period T4 displaying images according to the second view point image data signal.

According to the driving method of the display device in the related art in FIG. 1, in the case of the stereoscopic image driving, since at least the respective scan period and the light emitting period need to be included in order to display both a first view point image and a second view point image for one frame at 60 Hz, the first view point image and the second view point image need to be processed at ¼ Frame, or 240 Hz, respectively.

Further, as illustrated in FIG. 1, when the scan periods for all the pixels of the display panel and the light emitting periods according to the image data signal are separated from each other and the images are simultaneously displayed in all the pixels for the light emitting periods, it may be advantageous to prevent a motion blur phenomenon and implement the 3D stereoscopic image, but it is difficult to express accurate luminance because the light emitting period is limited to a half of one frame or less. Accordingly, even in the case of the non-3D stereoscopic image driving, since a light emitting ratio is not increased to maximize the light emitting luminance in order to ensure average luminance, there are problems in that driving voltage increases and power consumption increases. In addition, current is also increased during the light emitting period and, as a result, non-uniformity of luminance is increased due to an IR Drop.

Accordingly, the present disclosure describes a driving method of a display device wherein light is emitted by writing data after sufficiently resetting a pixel circuit of the entire display panel and compensating threshold voltage of a transistor when the image is expressed, regardless of driving of a general image or driving of the 3D stereoscopic image.

Figure 2:
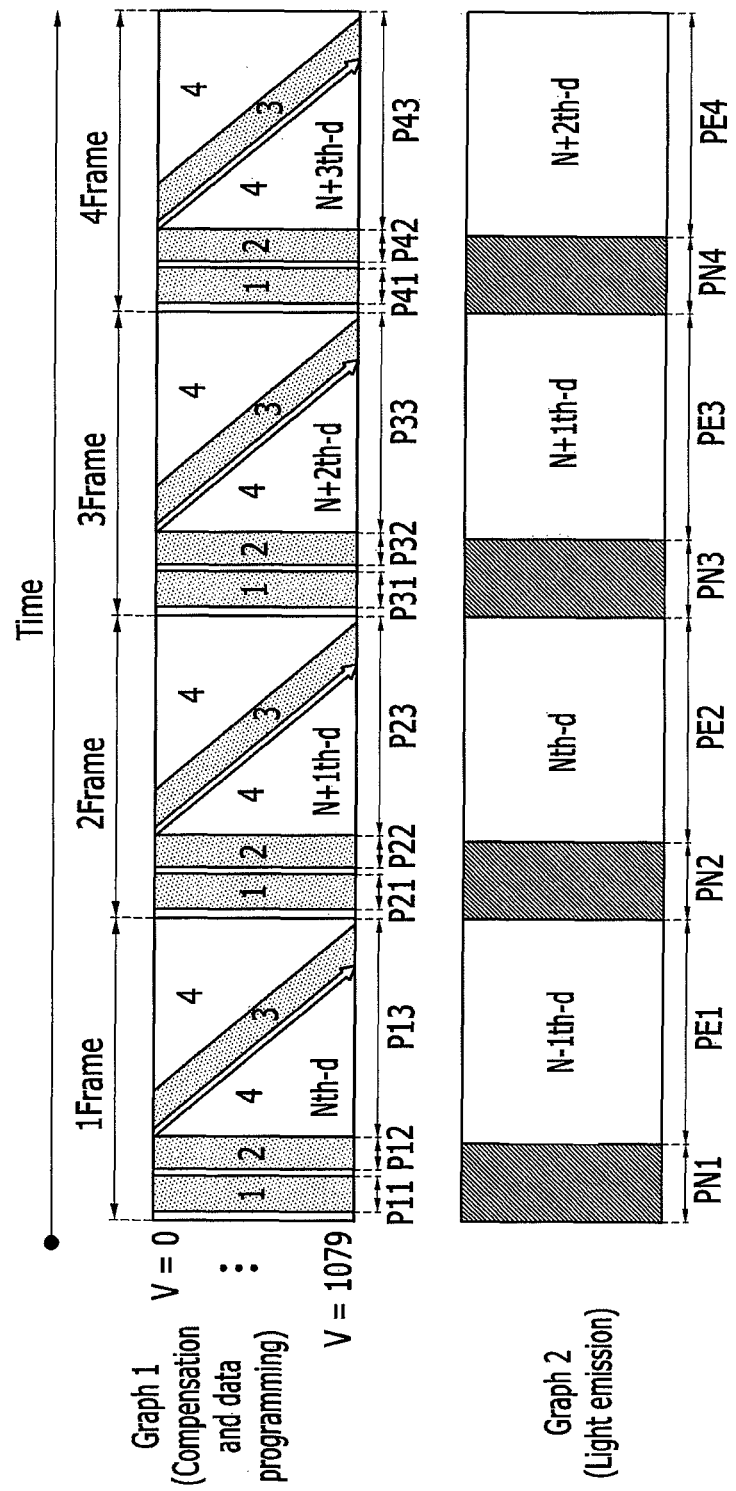
FIG. 2 is a diagram illustrating an embodiment of a driving method of a display device.

FIG. 2 is a diagram illustrating a driving method of a display device. The driving method of FIG. 2 illustrates a general method of implementing a 2D image.

FIG. 2 illustrates a first graph, Graph 1, representing a process of compensating threshold voltage of a driving transistor of each pixel included in a display panel and writing data while the same time elapses. FIG. 2 also illustrates a second graph, Graph 2, representing a light emitting process of the display panel.

The display panel according to the embodiment of FIG. 2 includes total 1080 pixel lines, but it is not necessarily limited thereto.

Further, in FIG. 2, as the time elapses, each frame is driven from a first frame 1Frame, in sequence.

In the driving method of the display device of the present invention according to FIG. 2, each of a plurality of frames includes a reset period 1, a threshold voltage compensating period 2, a data writing period 3, and a light emitting period 4. Among the periods, the data writing period 3 and the light emitting period 4 are simultaneously performed.

First, in the exemplary embodiment of FIG. 2, pixel circuits of the entire display panel are simultaneously reset for a reset period P11 of the first frame 1Frame. Here, the reset of the pixel circuit means that voltage according to the data signal inputted to each pixel circuit for a previous frame is set as predetermined reference voltage (reset voltage). That is, the reset of the pixel circuit means that the predetermined reset voltage is maintained by charging or discharging the data voltage according to each data signal of the previous frame which is charged in a storage capacitor of the pixel circuit.

Next, threshold voltages of the respective driving transistors including the pixel circuits of the entire display panel are simultaneously compensated during a threshold voltage compensating period P12 of the first frame. Since the threshold voltages of the driving transistors including the respective pixel circuits of the display panel are different from each other due to the manufacturing process of the display panel or its material characteristics, it is difficult to accurately express luminance of the pixel due to a deviation of the threshold voltages. Accordingly, for the threshold voltage compensating period P12, the threshold voltages of the driving transistors of all pixels are compensated at once in order to lessen non-uniformity of luminance according to a threshold voltage deviation of the driving transistor of each pixel.

According to another exemplary embodiment, an initialization period (not illustrated) may be further included between the reset period P11 and the threshold voltage compensating period P12. The initialization period is a period of applying initial voltage to the storage capacitor of each pixel in order to more precisely perform the reset for the data voltage of the previous frame which is applied to each pixel of the display panel.

The reset period P11 and the threshold voltage compensating period P12 of the first frame 1Frame correspond to a non-light emitting period PN1 for which none of the pixels emits light, as shown on Graph 2.

After the pixel circuits of the entire display panel are reset for the reset period P11 and the threshold voltages of the driving transistors of the entire display panel are compensated for the threshold voltage compensating period P12, the image data signals corresponding to the next sequential frame are sequentially transferred to each pixel of the entire display panel for each line for the data writing period, for V=0 through V=1079. That is, an image data signal Nth-d corresponding to a second frame 2Frame, which is the next sequential frame, is sequentially written for a data writing period P13 of the first frame 1Frame.

In FIG. 2, for the data writing period P13 of the first frame 1Frame, the image data signals Nth-d corresponding to the second frame 2Frame are sequentially written in each pixel of the display panel and simultaneously, all the pixels of the display panel emit light corresponding to an image data signal N−1th-d written in the previous frame (not shown) for a light emitting period PE1 of the first frame 1Frame.

After the image data signal Nth-d corresponding to the second frame 2Frame is written in the respective pixels for the data writing period P13 of the first frame 1Frame, the pixels of the entire display panel simultaneously display images according the image data signals for a light emitting period PE2 of the second frame 2Frame, shown on Graph 2.

Similarly, for the second frame 2Frame subsequent to the first frame, a reset period P21 of resetting data voltage according to the image data signals Nth-d written in the previous first frame, a threshold voltage compensating period P22 of compensating threshold voltage of the driving transistor of each pixel of the display panel, and a data writing period P23 for which an image data signal N+1th-d corresponding to the second frame 2Frame is sequentially written in each pixel of the display panel.

According to one embodiment of the driving method of the display device, the data writing and the light emitting for the predetermined frame are separated from each other, and the data writing is sequentially performed for each line of all the pixels and the light emitting is performed in all the pixels at the same time.

In some embodiments, the writing of the image data signal and the simultaneously emitting of the light according to the corresponding image data signal written in the previous frame are not separated from each other, but occur at the same time. Accordingly, the data writing period may be ensured so as to be substantially the same as the one frame period, and the light emitting period may freely determine a starting point and an ending point in one frame regardless of the data writing period.

Figure 3:
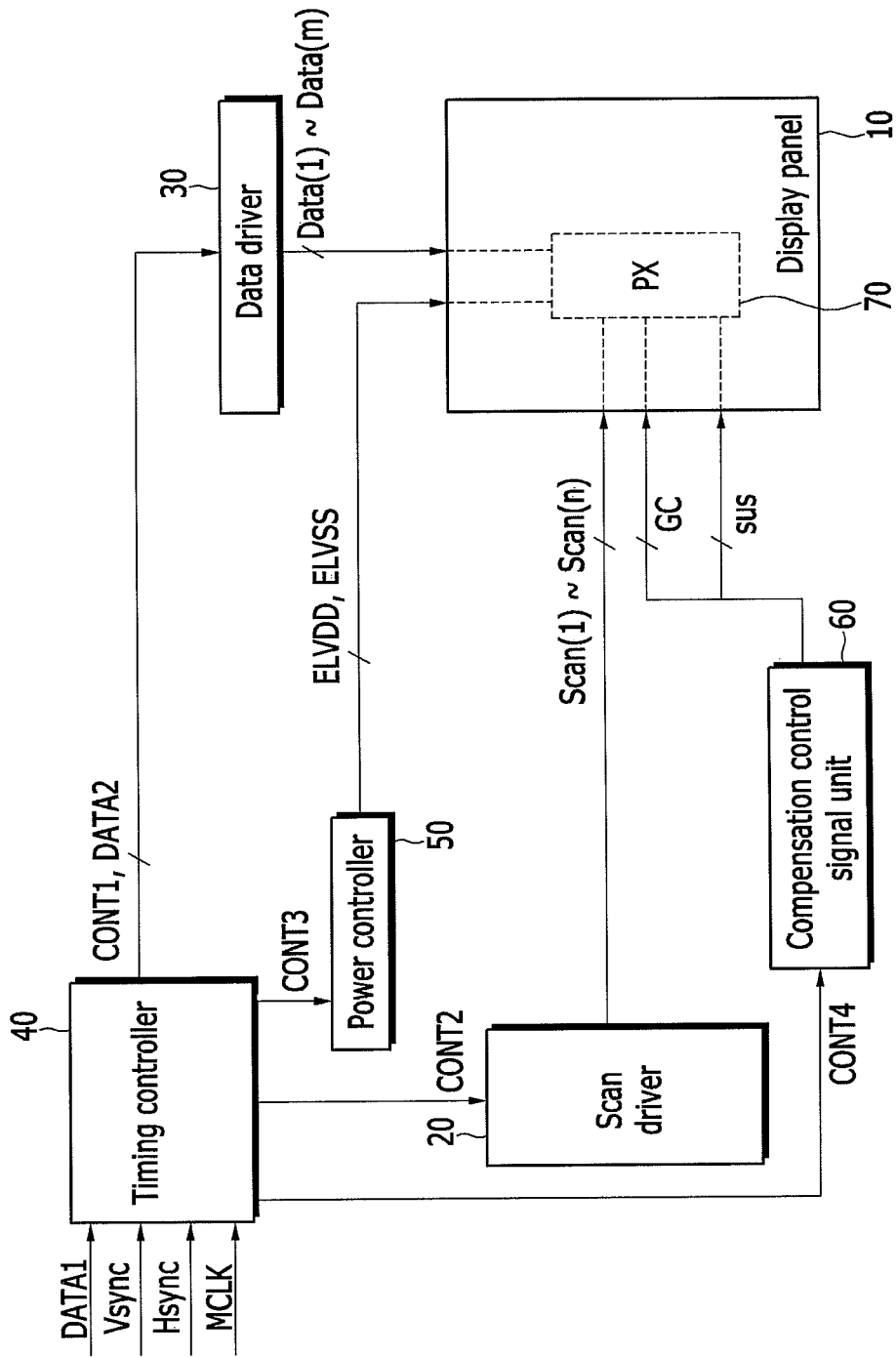
FIG. 3 is a block diagram illustrating a display device.

The configuration of the display device for applying the driving method is illustrated in a block diagram of FIG. 3.

The display device of FIG. 3 includes a display panel 10, a scan driver 20, a data driver 30, a timing controller 40, a power controller 50, and a compensation control signal unit 60.

The display panel 10 includes a plurality of pixels 70 which displays images by emitting light according to an image data signal DATA2 corresponding to an external image signal DATA1. The pixel 70 is connected to the corresponding data line via a plurality of data lines, which transfer a plurality of data signals data(1)-data(n) to the corresponding pixels and the corresponding scan lines of a plurality of scan lines which transfer a plurality of scan signals scan(1)-scan(n) to the corresponding pixels. The plurality of data signals data(1)-data(n) are image data signals corresponding to each pixel of the plurality of pixels, as image data signals generated through image processing processes such as luminance correction for the external image signal. Further, the plurality of scan signals scan(1)-scan(n) are signals activating the plurality of pixels so as to display images according to the data signals corresponding to the plurality of pixels included in the display panel.

Further, the pixel 70 is connected to a plurality of power supply lines transferring driving power supply voltages ELVDD and ELVSS from power controller 50.

In addition, the plurality of pixels 70 is connected to a corresponding first control signal line among a plurality of first control signal lines, transferring a plurality of first control signals GC, and a corresponding second control signal line among a plurality of second control signal lines, transferring a plurality of second control signals sus. The plurality of first control signals GC are signals transferred to each pixel for compensating threshold voltage of the driving transistor, in order to lessen non-uniformity of luminance due to a deviation of the threshold voltages of the driving transistors of all the pixels included in the display panel. In addition, the plurality of second control signals sus are signals for maintaining some node voltages of all the pixels included in the display panel at a predetermined value in response to each driving process.

Level controlling of the first control signals GC, the second control signals sus, and the driving power supply voltages, and transferring the scan signals and the data signals will be described below in detail with reference to FIGS. 4 and 5.

The scan driver 20 generates the plurality of scan signals scan(1)-scan(n) according to a scan control signal CONT2 and transfers the scan signals to the plurality of scan lines connected to the display panel 10. The scan control signal CONT2 controls the corresponding scan signal to be sequentially transferred to each of the plurality of pixels 70 included in the display panel 10 for each pixel line for the data writing period 3 of FIG. 2.

The data driver 30 transfers the image data signal DATA2, which corresponds to the external image signal DATA1, to the plurality of pixels of the display panel through the plurality of data lines Data(1)-Data(m), respectively, according to a data control signal CONT1. The data control signal CONT1 controls the corresponding image data signal to be sequentially transferred to each of the plurality of pixels activated by the scan signal for the data writing period 3 of FIG. 2. Then, each of the plurality of pixels activated by the scan signal stores the data voltage according to the corresponding image data signal to write the data.

The power controller 50 supplies voltage to drive each pixel via the power supply lines connected to each of the plurality of pixels according to a power supply control signal CONT3. The driving power supply voltage includes a first power supply voltage ELVDD which is a predetermined high level voltage and a second power supply voltage ELVSS which is a predetermined low-level voltage.

The power supply control signal CONT3 controls the voltage levels of the first power supply voltage ELVDD and the second power supply voltage ELVSS to be controlled in the power controller 50 in response to each driving process. The power controller 50 determines the levels of the first power supply voltage ELVDD and the second power supply voltage ELVSS by the power supply control signal CONT3 according to the reset period 1, the threshold voltage compensating period 2, the data writing period 3, and the light emitting period 4 to supply the determined levels to the power supply line.

The compensation control signal unit 60 generates and transfers a plurality of first control signals GC and a plurality of second control signals sus in the plurality of pixels of the display panel according to a compensation control signal CONT4. According to the exemplary embodiment, the compensation control signal CONT4 may include a first compensation control signal determining pulse voltage levels of the plurality of first control signals GC in response to the driving period according to the driving method of the present invention and a second compensation control signal determining pulse voltage levels of the plurality of second control signals sus.

Particularly, the compensation control signal CONT4 determines levels of the first control signal GC and the second compensation control signal sus for the threshold voltage compensating period 2 to supply the determined levels to the plurality of first control signal lines and the plurality of second control signal lines, respectively.

The timing controller 40 generates the corresponding image data signal DATA2 from the external image signal DATA1 and controls functions and driving of the respective elements of the display device. The timing controller 40 classifies the image signal DATA1 into a frame unit according to a vertical synchronization signal Vsync and classifies the image signal DATA1 into a pixel line (scan line) unit according to a horizontal synchronization signal Hsync, and thereby processes the external image signal DATA1 to generate an image data signal DATA2. The image data signal DATA2 is transmitted to the data driver 30 together with the data control signal CONT1.

The image signal DATA1 and the vertical synchronization signal Vsync, the horizontal synchronization signal Hsync, and a synchronization signal of the main clock signal MCLK are processed from the external input signal.

The image signal DATA1 is a signal processed to the image signal corresponding to the corresponding frame by classifying the external input signal into each frame unit. In some cases, the image signal DATA1 may include image signals corresponding to a left-eye view point and a right-eye view point for implementing the 3D stereoscopic image. The timing controller 40 arranges an image data signal of a first view point (left eye or right eye) and an image data signal of a second view point (right eye or left eye) from the external input signal according to vertical synchronization and horizontal synchronization.

According to one embodiment, since the data writing and the light emitting are simultaneously performed in the display panel, the entire scan period for the display panel as the data writing period 3 may occur for a period one of one frame at 60 Hz. Therefore, the vertical synchronization signal Vsync may be transferred every scan period close to one frame at 60 Hz. Further, the horizontal synchronization signal Hsync may be set as a frequency required to activate all the pixels for the data writing period 3 around the pixel line, as a frequency determined according to the data writing period 3 which is the scan period of the one frame period.

The main clock signal MCLK may be one of a clock signal having a basic frequency included in the external input signal or a clock signal generated by a proper pre-processing.

Figure 4:
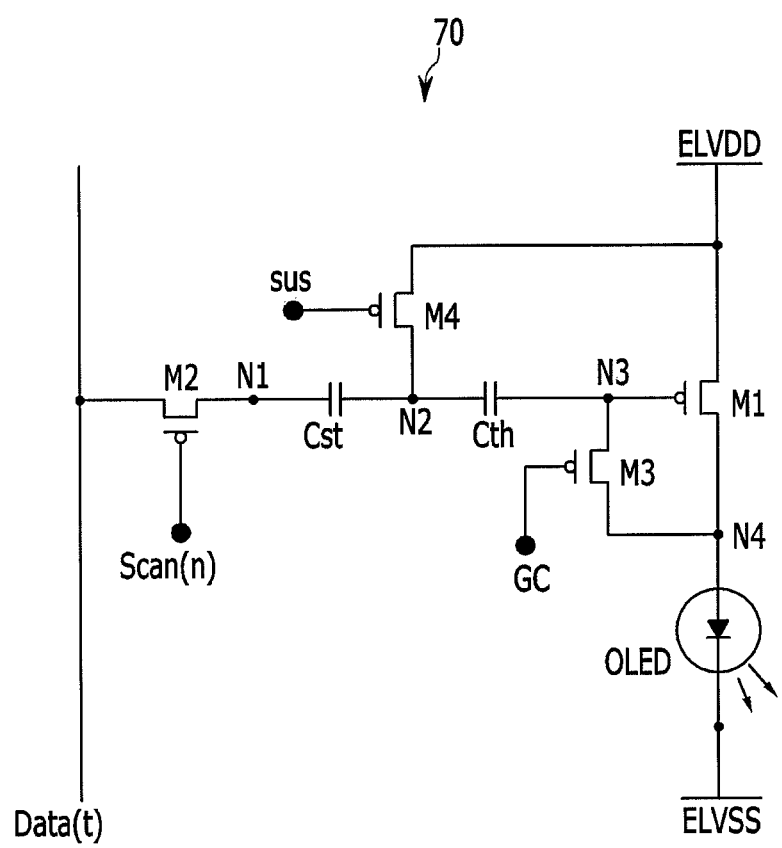
FIG. 4 is a circuit diagram illustrating a structure of a pixel included in the display device of FIG. 3.

FIG. 4 is a circuit diagram illustrating a structure of the pixel 70 included in the display device of FIG. 3.

Referring to FIG. 4, the pixel 70 included in the display panel 10 includes an organic light emitting diode (OLED) which emits light according to an image data signal and a driving circuit. The driving circuit includes four transistors including a driving transistor M1, a switching transistor M2, a compensation transistor M3, a sustain transistor M4, and two capacitors including a storage capacitor Cst and a compensation capacitor Cth.

One embodiment of the display device includes a simple pixel circuit of FIG. 4 including four transistors and two capacitors. Further, according to the pixel circuit structure of FIG. 4, since a power supply wire for supplying reference voltage or initial voltage in order to store the data voltage is not separately provided, the layout is simplified, and the layout is easier to ensure the proper aperture ratio and ensure the manufacturing yield of the display panel.

The pixel 70 illustrated in FIG. 4 represents a pixel included in an n-th pixel line among all the pixels of the display panel. Accordingly, although not illustrated in FIG. 4, the pixel 70 is connected to a scan line corresponding to an n-th pixel row and a data line corresponding to a predetermined pixel column (hereinafter, assumed as an m-th pixel column) among the pixels corresponding to an n-th pixel row.

Referring to FIG. 4, the driving transistor M1 of the pixel 70 includes a drain electrode connected with an anode of the OLED, a gate electrode connected to a third node N3 connected with one electrode of the compensation capacitor M3, and a source electrode connected to the first power supply voltage ELVDD. The driving transistor M1 controls driving current supplied to the OLED as current according to an image data signal corresponding to each pixel.

The switching transistor M2 includes a source electrode connected to the data line corresponding to the m-th pixel column, a gate electrode connected to the scan line corresponding to the n-th pixel row, and a drain electrode connected to a first node N1 connected with the storage capacitor Cst. The switching transistor M2 activates the corresponding pixel in response to the corresponding scan line applied to the gate electrode. The corresponding scan signal Scan(n) is inputted to the gate electrode of the switching transistor M2, and, as a result, the corresponding image data signal Data(t) is transferred from the data line through the source electrode of the switching transistor M2 of the activated pixel.

The compensation transistor M3 includes a gate electrode connected to the first control signal line which supplies first control signal GC and two electrodes, one connected to the drain electrode at node N4. and the other connected to the gate electrode of the driving transistor M1. The compensation transistor M3 diode-connects the drain electrode and the gate electrode of the driving transistor M14 in response to the first control signal GC transferred at a predetermined pulse voltage level for a period of compensating the threshold voltage of the driving transistor in the driving method according to the exemplary embodiment of the present invention.

The sustain transistor M4 includes a gate electrode connected to the second control signal line, supplies the second control signal sus, a source electrode connected to a power supply line to which the first power supply voltage ELVDD is applied, and a drain electrode connected to a second node N2 to which the storage capacitor Cst and the compensation capacitor Cth are connected. The sustain transistor M4 transfers the first power supply voltage ELVDD to the second node N2 in response to the second control signal sus which is controlled at a predetermined pulse voltage level correspondingly to each driving period in the driving method according to the exemplary embodiment of the present invention.

The transistors of the pixel circuit illustrated in FIG. 4 are configured as PMOS types, but are not limited thereto and may be configured by NMOS type transistors.

Meanwhile, the storage capacitor Cst includes one electrode connected to the first node N1 to which the drain electrode of the switching transistor M2 is connected and the other electrode connected to the second node N2. The storage capacitor Cst stores voltage transferred from the data line through the switching transistor M2. The voltage transferred from the data line includes data voltage according to the image data signal corresponding to the pixel 70. Particularly, the storage capacitor Cst writes and stores data voltage according to the image data signal corresponding to the predetermined frame, while the OLED emits light according to the image data signal corresponding to the previous frame of the predetermined frame.

Further, the compensation capacitor Cth includes one electrode connected to the second node N2 and the other electrode connected to the third node N3 to which the gate electrode of the driving transistor M1 is connected. The compensation capacitor Cth maintains the gate electrode voltage of the driving transistor M1 at a predetermined voltage value for the threshold voltage compensating period.

Hereinafter, functions and operations of respective circuit elements included in the pixel 70 illustrated in FIG. 4 will be described for each driving period with reference to a driving waveform diagram depicted in FIG. 5.

Figure 5:
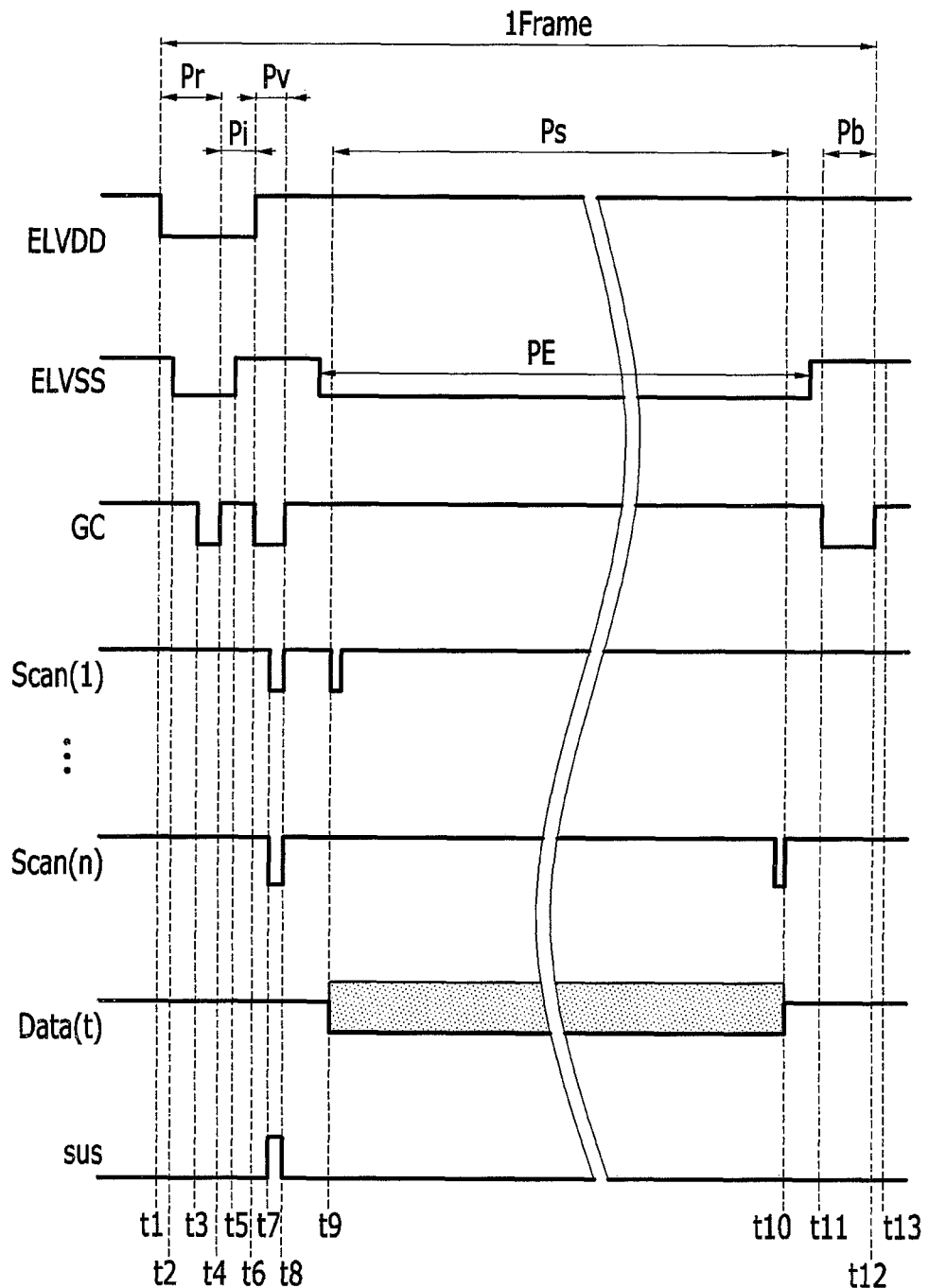
FIG. 5 is a driving waveform diagram for the pixel of FIG. 4.

FIG. 5 illustrates a voltage level of driving power supply voltage and pulse voltage levels of signals transferred through power supply lines or signal wires in order to operate each pixel for each driving period.

FIG. 5 illustrates voltage waveforms of the first power supply voltage ELVDD, the second power supply voltage ELVSS, the first control signal GC, and the second control signal sus which are transferred to each pixel for one frame. In addition, FIG. 5 illustrates scan signals scan(1)-scan(n) which are sequentially transferred to all the pixels along the pixel line and data voltage transferred through the data line corresponding to the each pixel.

Driving order and process depicted in FIG. 5 are similar to those of the driving method illustrated in FIG. 2, but the driving method of FIG. 5 includes an initialization period Pi between a reset period Pr and a threshold voltage compensating period Pv. In some embodiments, the initialization period Pi may be omitted.

In FIG. 5, a period of a time t1 to a time t4 is the reset period Pr. The second control signal sus is transferred as a low-level pulse voltage for the reset period Pr. In addition, all of the scan signals scan(1)-scan(n) transferred to all the pixels are transferred as high-level voltages. In addition, at the time t1, the first power supply voltage ELVDD is converted and transferred into predetermined low-level voltage. The predetermined low-level voltage may be 0 V.

Then, the switching transistor M2 of the pixel 70 is turned off at the time t1, and the sustain transistor M4 is turned on to transfer the first power supply voltage ELVDD converted into the low-level voltage to the second node N2. In this case, the voltage of the third node N3 is lowered to the low level of the first power supply voltage ELVDD due to a coupling effect of the compensation capacitor Cth. Then, the voltage of the fourth node N4 to which the anode of the OLED is connected is lowered to the low level to be reset.

Thereafter, at the time t2, when the second power supply voltage ELVSS drops to a predetermined low-level voltage, the voltage of the fourth node N4 drops to lower voltage, and as a result, voltage according to light emitting current transferred in the previous frame is reset.

In addition, at the time t3, when the pulse voltage of the first control signal GC transferred to the gate electrode of the compensation transistor M3 of the pixel drops to the low level, the compensation transistor M3 is turned on, and as a result, the voltage of the fourth node N4 is further lowered to the lowered voltage of the third node N3. The voltage of the third node N3 and the voltage of the fourth node N4 are maintained at constant voltage close to the low-level voltage of the first power supply voltage ELVDD through the operation.

In the exemplary embodiment of FIG. 5, a period of a time t4 to a time t6 is the initialization period Pi. At the time t4, the pulse voltage of the first control signal GC transferred to the gate electrode of the compensation transistor M3 of the pixel rises from the low level to the high level. Then, the compensation transistor M3 is turned off.

In addition, at the time t5, the voltage level of the second power supply voltage ELVSS increases. Then, the voltage of the fourth node N4 is increased by a capacitor function of the OLED. In this case, since the voltage of the third node N3 is maintained at a low potential and the voltage level of the first power supply voltage ELVDD is in the low state, current flows through the driving transistor M1. Then, the voltage of the fourth node N4 is decreased again.

A period of a time t6 to a time t8 subsequent to the initialization period Pi is the compensation period Pv.

At the time t6, the first power supply voltage ELVDD is changed to the high level, and the pulse voltage of the first control signal GC is decreased to the low level again. The high-level voltage of the first power supply voltage ELVDD is not particularly limited, but may be about 12 V.

The compensation transistor M3 of the pixel is turned on in response to the first control signal GC at the time t6. Then, the drain electrode and the gate electrode of the driving transistor M1 are diode-connected to each other. That is, the fourth node N4 to which the drain electrode of the driving transistor M1 is connected and the third node N3 to which the gate electrode of the driving transistor M1 is connected are diode-connected to each other, and the voltage of the third node N3 is maintained at threshold voltage (hereinafter, referred to as Vth) of the driving transistor M1.

In this case, the first power supply voltage ELVDD of the high level is applied to the second node N2, and the voltage of the third node N3 is maintained at the first power supply voltage of the high level (hereinafter, referred to as ELVDD_high) plus Vth of the driving transistor M1 due to the coupling effect of the compensation capacitor Cth.

Thereafter, at the time t7, the pulse voltage of the second control signal sus is increased to the high level to be transferred to the sustain transistor M4 of the pixel 70. Then, the sustain transistor M4 is turned off. Further, at the time t7, the scan signals scan(1)-scan(n) are applied to the switching transistors M2 of each of the plurality of pixels 70 at the low level. Then, the switching transistors M2 of all the pixels are turned on to connect one electrode of the storage capacitor Cst with the corresponding data lines. In this case, the same predetermined reference voltage Vref may be applied through the data line corresponding to each pixel. Accordingly, the voltage of the first node N1 is applied as the reference voltage Vref.

At this time, the voltage value stored in the storage capacitor Cst is voltage ELVDD_high-data (which will be described below for the data writing period) in the data writing process of the previous frame, the voltage applied to the second node N2 becomes ELVDD_high-data+Vref. However, since a capacitance C_oled of the OLED and a parasitic capacitance C_para of the driving transistor are connected to the compensation capacitor Cth in series, and connected to the storage capacitor Cst, the voltage of the second node N2 may be calculated as follows.

$$V_{N2}(\text{Voltage of second node } N2 = \quad \text{(Equation 1)}$$
$$\text{previous voltage of second node } N2 +$$
$$\text{voltage change of second node } N2 *$$
$$[C\_st/(C\_st + Cx)] = \text{ELVDD\_high} +$$
$$(-data + Vref) * \alpha$$

-continued

Herein, $\alpha = C\_st/(C\_st + Cx)$ $Cx = C\_th * (C\_oled + C\_para)/(C\_th + C\_oled + C\_para)$, where, C_st is capacitance of the storage capacitor, C_th is capacitance of the compensation capacitor, C_oled is capacitance of the OLED, and C_para is capacitance of the parasitic capacitor of the driving transistor.

In addition, as described above, the voltage of the third node N3 is maintained at voltage ELVDD_high+Vth increasing by the first power supply voltage of the high level (hereinafter, referred to as ELVDD_high) from the threshold voltage of the transistor M1.

Thereafter, at the time t8, the pulse voltage of the second control signal sus is changed to the low level and is applied to the sustain transistor M4 of the pixel 70. The scan signals scan(1)-scan(n) transferred to the respective switching transistors M2 of each of the plurality of pixels are changed to the high levels to be transferred.

Then, the voltage of the second node N2 is applied to a high-level first power supply voltage ELVDD_high. In this case, a voltage difference applied to both electrodes is stored in the compensation capacitor Cth. That is, a difference between voltage $V_{N2}$ of the second node N2 calculated by Equation 1 and the voltage ELVDD_high+Vth applied to the third node N3 is stored. Accordingly, the voltage stored in the compensation capacitor Cth is (ELVDD_high+Vth)−V_N2.

Then, at time t8, when the voltage of the second node N2 is changed to the ELVDD_high, the voltage value of the third node N3 is changed due to the coupling effect of the compensation capacitor. In this case, the changed voltage value of the third node N3 is the value of multiplying the changed voltage value of the second node N2 by a proportional constant β, where β=C_th/(C_th+C_para)

Then, at time t8 when the threshold voltage compensating period Pv ends, the voltage of the third node N3 is calculated as follows.

Voltage $V_{N3}$ of third node $N3 =$ (Equation 2)

voltage of previous third node $N3 +$ voltage change of second node $N2 * \beta =$ $(ELVDD\_high + Vth) + (ELVDD\_high - V\_N2) * \beta =$ $(1 + \beta)(ELVDD\_high) + Vth - V\_N2 * \beta =$ $(1 + \beta)(ELVDD\_high) + Vth -$ $\beta(ELVDD\_high + (-data + Vref) * \alpha) =$ $ELVDD\_high + Vth - \alpha^*\beta(-data + Vref)$ In some embodiments of the driving method, the light emitting period and the data writing period are performed at the same time. Accordingly, a data writing period Ps when the image data signal of the corresponding frame is written and a light emitting period PE when light is emitted at driving current according to the image data signal of the corresponding frame are performed at least in part at the same time. In some cases, such as depicted in FIG. 5, the light emitting period PE may be longer than the data writing period Ps.

In detail, before the time t9 when the data writing period Ps starts, the voltage level of the second power supply voltage ELVSS is changed to the low level. The low voltage level of the second power supply voltage ELVSS is not particularly limited, but may be 0 V or less.

Then, since the voltage of the cathode of the OLED to which the second power supply voltage ELVSS is applied changes to the low level, the driving current flows to the organic light emitting diode (OLED) included in each pixel of the entire display panel of the display device. The driving current is driving current according to the image data signal transferred from the previous frame. Then, for the light emitting period PE, images according to the image data signal transferred to the previous frame may be simultaneously expressed in the entire display panel.

In detail, driving current I_OLED flowing to OLED during the light emitting period PE is as follows.

$I\_OLED=k(Vgs-Vth)^2=k(ELVDD\_high+Vth-\alpha^*\beta(-data+Vref)-ELVDD\_high-Vth)^2=k[\alpha^*\beta(Vref-data)]^2$, (Equation 3)

where, k is a proportional constant based on a material characteristic of the driving transistor.

According to Equation 3, the display images which emit light simultaneously in all the pixels of the display panel for the light emitting period PE correspond to the driving current which is not influenced by threshold voltage Vth of the driving transistor and the voltage level of the first power supply voltage ELVDD, uniform images may be displayed in the display panel.

The writing period Ps of the image data signal in the current frame which is performed simultaneously with the light emitting period PE starts when the scan signal Scan(1) is transferred to the first scan line at low-level pulse voltage at the time t9.

At the time t9, since the second control signal sus transferred to the gate electrode of the sustain transistor M4 has the low-level pulse voltage, the sustain transistor M4 is turned on, and thus the second node N2 is connected to the first power supply voltage ELVDD. In addition, while the third node N3 voltage is maintained, for the period of the time t9 to the time t10, the plurality of scan signals scan(1)-scan(n) are sequentially transferred to all the pixels of the display panel for each line through the plurality of scan lines at the low-level pulse voltage.

Then, when the switching transistors M2 included in the plurality of pixels included in each pixel line is turned on, the data voltage according to the image data signal corresponding to the current frame is stored in the storage capacitor Cst. That is, the image data signal corresponding to the current frame is stored in the storage capacitor Cst. In this case, the voltage of storage capacitor Cst is voltage ELVDD_high-data corresponding to a difference between the high-level first power supply voltage ELVDD_high and the data voltage data according to the image data signal corresponding to the current frame.

After the image data signals corresponding to the current frame are sequentially written for the data writing period Ps, light is simultaneously emitted in all the pixels for a light emitting period (not illustrated in FIG. 5) of the next frame.

In the driving method of the display device according the exemplary embodiment of FIG. 5, after the data writing period Ps, or the light emitting period PE ends, a bias period Pb may be further included.

The bias period Pb starts when the voltage level of the second power supply voltage ELVSS is increased from the low level to the high level and transferred and the first control signal GC is applied at the low-level pulse voltage at a time t11, after the light emitting period PE ends. Then, since the voltages of the gate electrode, the source electrode, and the drain electrode of the driving transistor M1 by turning on the compensation transistor M3 may be applied at predetermined voltages, a response waveform of each pixel may be improved. In some embodiments, the bias period may be omitted in the driving process of the display device.

As such, since the light emitting and the data writing are performed within in one frame, scanning need not performed at about 240 Hz, but may be performed at about 60 Hz throughout the time of one frame. In the case of driving of the stereoscopic image display, the scan period for implementing each view point image may be performed at a speed of about 120 Hz.

Furthermore, since the data is written based on the data line and the driving power supply line and the compensating of the threshold voltage occurs based on the data line designed with an equivalent resistance, an additional supply wire of the reference voltage Vref is not required, and thus, a more stable and uniform display is achieved.

Figure 6:
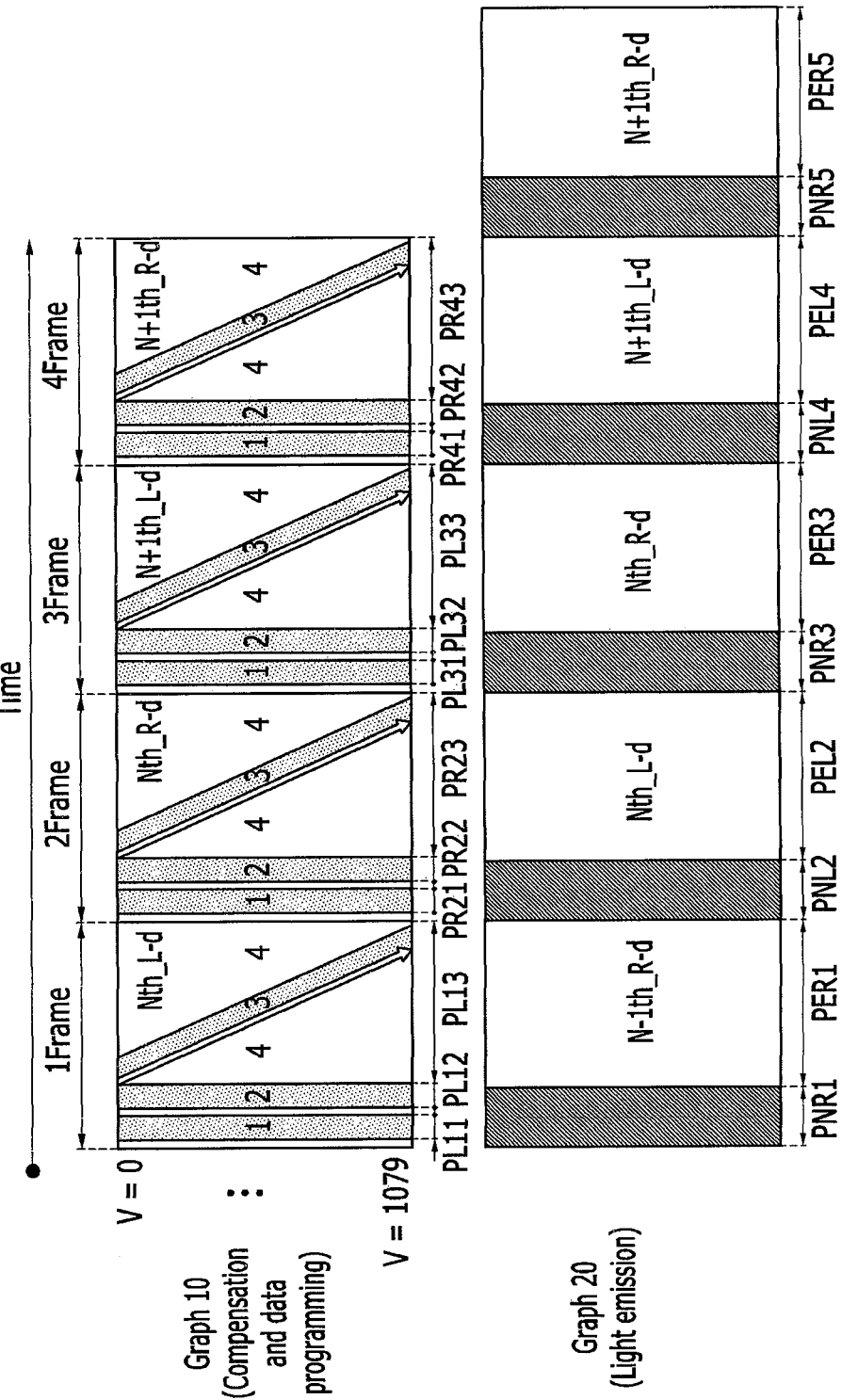
FIG. 6 is a diagram illustrating an embodiment of a driving method of a display device.

FIG. 6 is a diagram illustrating a driving method which displays a 3D stereoscopic image.

For understanding of the driving process, similar to the driving method of FIG. 2, in FIG. 6, a Graph 10 represents compensating of threshold voltage and writing of data, and Graph 20 represents emitting of light along the same time axis as Graph 10.

In FIG. 6, one viewpoint image (for either the left eye or right eye) is displayed for every one frame. However, embodiments herein are not limited thereto. That is, the display device may be driven so as to display different viewpoint images at the same time in one frame.

Referring to FIG. 6, each of a plurality of frames includes a reset period 1, a threshold voltage compensating period 2, a data writing period 3, and a light emitting period 4. The data writing period 3 and the light emitting period 4 are simultaneously performed. That is, the reset period 1, the threshold voltage compensating period 2, and the data writing period 3 of writing data voltage according to a first viewpoint image (left eye or right eye) data signal, and the reset period 1, the threshold voltage compensating period 2, and the data writing period 3 of writing data voltage according to a second viewpoint image (right eye or left eye) data signal are repeated.

As shown in Graph 20, for the subsequent frame, a non-light emitting period and a light emitting period of emitting light by all pixels at the same time according to the first viewpoint image data signal, and a non-light emitting period and a light emitting period of emitting light by all pixels at the same time at driving current according to the second viewpoint image data signal are repeated.

As shown in FIG. 6, the left eye image and the right eye image are displayed according to a driving time.

First, pixel circuits of the entire display panel are simultaneously reset for a reset period PL11 of the first frame 1Frame. Next, threshold voltages of the respective driving transistors included the pixel circuits of the entire display panel are simultaneously compensated for a threshold voltage compensating period PL12. The reset period PL11 of the first frame 1Frame and the threshold voltage compensating period PL12 correspond to a non-light emitting period PNR1.

Next, a left eye image data signal Nth_L-d to be displayed for a light emitting period PEL2 of a second frame 2Frame which is the next frame is sequentially written during the data writing period PL13 of the first frame 1Frame. The pixels of the entire display panel simultaneously display images according to a right eye image data signal N−1 th_R-d of the previous frame stored in each pixel in advance, corresponding to a light emitting period PER1 of the first frame 1Frame.

Similarly, for the second frame 2Frame subsequent to the first frame, a reset period PR21 of resetting data voltage according to the left eye image data signal Nth_L-d written in the first frame, a threshold voltage compensating period PR22 of compensating threshold voltage of the driving transistor of each pixel of the display panel, and a data writing period P23 for which the right eye image data signal Nth_R-d corresponding to the second frame 2Frame are sequentially written in each pixel of the display panel.

As described above, all the pixels emit light at the driving current according to the left eye data signal stored in the data writing period PL13 of the first frame 1 for the light emitting period PEL2 simultaneously with the data writing period PR23 of the second frame 2Frame.

The right eye image data signal Nth_R-d sequentially written for the data writing period PR23 of the second frame 2Frame emits light according to the driving current corresponding to all the pixels in a light emitting period PER3 of a third frame 3Frame.

Accordingly, the light emitting period PEL2 of the second frame 2Frame and the light emitting period PER3 of the third frame 3Frame alternately display the left eye image and then the right eye image, in a repeating sequence, thereby implementing the 3D stereoscopic image on the screen.

According to the stereoscopic image driving method of FIG. 6, the left eye image data signals and right eye image data signals are alternately written in sequence and the inputted left eye image data and right eye image data simultaneously emit the light in sequence, thereby expressing the 3D images. In this case, the light emitting duration may be freely set regardless of scanning of each pixel of the display panel. Accordingly, a time interval between the respective view point images may be set so as to be optimized by a response speed of liquid crystal shutters of shutter glasses of a stereoscopic display device and the like.

The drawings referred to in the above and disclosed description only illustrative and are not intended to restrict the meanings or the scope of the present disclosure. Therefore, those skilled in the art can easily select and substitute the drawings and disclosed description. Those skilled in the art can omit some of the constituent elements described in the present specification without deterioration in performance thereof or can add constituent elements to improve performance thereof. Furthermore, those skilled in the art can modify the sequence of the steps of the method described in the present specification depending on the process environment or equipment. Therefore, the scope of the present invention must be determined by the scope of the claims and the equivalent, not by the described embodiments.

What is claimed is:
1. A display device, comprising:
a display panel including a plurality of pixels configured to write a first image data signal corresponding to a first frame and configured to emit light according to a driving current based on a second image data signal corresponding to a second frame which is previous to the first frame, each of the plurality of pixels comprising:
an organic light emitting diode;
a driving transistor configured to transfer the driving current to the organic light emitting diode;
a switching transistor configured to transfer data voltage of the first image data signal to the gate electrode of the driving transistor thereby activating the pixel in response to the scan signal;
a storage capacitor connected to a drain electrode of the switching transistor at a first node, and to a second node, wherein the storage capacitor is configured to store data voltage of the first image data signal for the data writing period;

a sustain transistor connected between the second node and a first power supply, wherein the sustain transistor is configured to adjust a contact point voltage of the driving transistor and the switching transistor according to a first power supply voltage; and a sustain capacitor connected to the second node and to a gate electrode of the driving transistor at a third node, the sustain capacitor configured to sustain gate electrode voltage of the driving transistor at a predetermined voltage value for the compensating period; and wherein the first frame includes a reset period wherein data voltages are reset to voltages of the second image data signal, a compensating period wherein threshold voltages of a driving transistor of each of the plurality of pixels are compensated substantially at the same time, a data writing period wherein scan signals corresponding to the plurality of pixels corresponding to the first image data signal are written, and a light emitting period wherein light is emitted by the plurality of pixels according to the second image data signal; and wherein the data writing period and the light emitting period overlap each other.

2. The display device of claim 1, wherein:
the first image data signal is a first viewpoint image data signal or a second viewpoint image data signal,
the second image data signal is a first view point image data signal or a second view point image data signal corresponding to the previous frame, and
wherein the viewpoint data signals of the first image data signal and the second image data signal are different from each other.

3. The display device of claim 1, wherein:
the first image data signal is a first view point image data signal or a second view point image data signal, and
the plurality of pixels simultaneously emits light based on a driving current which corresponds to the first image data signal.

4. The display device of claim 1, wherein the first image data signal is written simultaneously with the light emitting period of the second frame which is previous to the first frame.

5. The display device of claim 1, wherein the data writing period is equal to or smaller than the light emitting period.

6. The display device of claim 1, wherein the duration of the light emitting period is determined in the reset period.

7. The display device of claim 1, wherein none of the plurality of pixels emits light for the reset period and the compensating period.

8. The display device of claim 1, wherein the first frame further includes a bias period of applying voltages of a gate electrode, a source electrode, and a drain electrode of the driving transistor of one of the plurality of pixels as predetermined voltages after the light emitting period ends.

9. The display device of claim 1, wherein each of the plurality of pixels further includes:
a compensation transistor connected between the gate electrode and the drain electrode of the driving transistor to diode-connect the gate electrode and the drain electrode of the driving transistor during the compensating period.

10. The display device of claim 9, wherein the storage capacitor is configured to store the data voltage of the first image data signal until a light emitting period of a subsequent frame.

11. The display device of claim 9, wherein:
the first power supply voltage and a second power supply voltage are connected to a cathode of the organic light emitting diode and is configured to be transferred at a low level for a reset period;
a first control signal configured to be transferred to the gate electrode of the compensation transistor at a gate-on voltage level for the reset period; and
a second control signal configured to be transferred to the gate electrode of the sustain transistor at a gate-on voltage level for the reset period.

12. The display device of claim 9, wherein:
the first power supply voltage and a second power supply voltage connected to a cathode of the organic light emitting diode are configured to be transferred at a predetermined high level for a compensating period;
a first control signal configured to be transferred at a gate-on voltage level for the compensating period, and
a scan signal configured to be transferred to the gate electrode of the switching transistor at a gate-on voltage level for the compensating period;
a second control signal configured to be transferred to the gate electrode of the sustain transistor at a gate-off voltage level for the compensating period, and
a predetermined reference voltage configured to be applied to one electrode of the storage capacitor through the turned-on switching transistor for the compensating period.

13. The display device of claim 9, wherein:
a plurality of scan signals having gate-on voltage levels are configured to be sequentially transferred to the gate electrode of the switching transistor of each of the plurality of pixels for the data writing period;
a first control signal is configured to be transferred to the gate electrode of the compensation transistor at a gate-off voltage level for the data writing period,
a second control signal is configured to be transferred to the gate electrode of the sustain transistor at a gate-on voltage level for the data writing period; and
the first power supply voltage is configured to be transferred at a predetermined high level for the data writing period and a second power supply voltage is connected to a cathode of the organic light emitting diode and is configured to be transferred to a predetermined low level.

14. The display device of claim 1, wherein the display device further comprises:
a scan driver configured to generate and transfer a plurality of scan signals to activate driving of the plurality of pixels,
a data driver configured to transfer data voltage according to the first image data signal corresponding to the plurality of pixels,
a power controller configured to control driving power supply voltage supplied to the plurality of pixels.
a compensation control signal unit configured to generate and transfer a first control signal and a second control signal for controlling open and close of the driving transistor in each of the plurality of pixels; and
a timing controller configured to generate the first image data signal by processing an external image signal to transfer the generated first image data signal to the data driver and controlling driving of the scan driver, the data driver, the power supply controller, and the compensation control signal unit.

15. A method of driving the a display device of claim 1, the method comprising:

resetting data voltage according to the second image data signal to a predetermined voltage;

compensating threshold voltages of driving transistors of the plurality of pixels at the same time;

transferring scan signals corresponding to the plurality of pixels in sequence to activate the plurality of pixels;

writing the first image data signal; and emitting light according to the second image data signal, wherein writing the first image data signal and emitting light overlap with each other.

16. The driving method of display device of claim 15, wherein:

the first image data signal is a first viewpoint image data signal or a second view point image data signal, the second image data signal is a first viewpoint image data signal or a second view point image data signal corresponding to a frame previous to the first frame, and the viewpoint image data signals of the first image data signal and the second image data signal are different from each other.

17. The driving method of display device of claim 15, wherein:

the first image data signal is a first view point image data signal or a second view point image data signal, and the plurality of pixels emits light according to a driving current corresponding to the first image data signal for a light emitting period.

18. The driving method of display device of claim 15, wherein writing the first image data signal is performed simultaneously with the emitting light according to the second image data signal.

19. The driving method of display device of claim 15, wherein the period of writing the first image data signal is equal to or smaller than the period of emitting light according to the second image data signal.

20. The driving method of display device of claim 15, wherein the emitting light according to the second image data signal is performed within a period when the resetting and the compensating of the one frame are not performed.

21. The driving method of display device of claim 15, wherein while resetting and the compensating of the one frame are performed, none of the plurality of pixels emits light.

22. The driving method of display device of claim 15, further comprising:

setting voltages of gate electrodes, source electrodes, and drain electrodes of the driving transistor of each of the plurality of pixels as predetermined voltages, after the emitting light according to the second image data signal.

* * * * *